(12) United States Patent
Cheriton

(10) Patent No.: US 9,111,013 B2
(45) Date of Patent: Aug. 18, 2015

(54) HIERARCHICAL ASSOCIATIVE MEMORY-BASED CLASSIFICATION SYSTEM

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1929 days.

(21) Appl. No.: 11/297,551

(22) Filed: Dec. 8, 2005

(65) Prior Publication Data

US 2006/0155875 A1 Jul. 13, 2006

Related U.S. Application Data

(62) Division of application No. 09/613,039, filed on Jul. 10, 2000, now Pat. No. 7,051,078.

(51) Int. Cl.
*G06F 7/00* (2006.01)
*G06F 17/30* (2006.01)
*H04L 29/06* (2006.01)

(52) U.S. Cl.
CPC .......... *G06F 17/30982* (2013.01); *H04L 69/22* (2013.01); *G06F 17/30876* (2013.01)

(58) Field of Classification Search
USPC .............................. 707/104.1, 100, 10, 2, 758
See application file for complete search history.

(56) References Cited

U.S. PATENT DOCUMENTS

| | | | | |
|---|---|---|---|---|
| 4,974,191 A | * | 11/1990 | Amirghodsi et al. | 704/8 |
| 5,276,899 A | * | 1/1994 | Neches | 709/240 |
| 5,386,413 A | | 1/1995 | McAuley et al. | |
| 5,440,715 A | | 8/1995 | Wyland | |
| 5,450,351 A | | 9/1995 | Heddes | |
| 5,615,360 A | * | 3/1997 | Bezek et al. | 1/1 |
| 5,758,148 A | | 5/1998 | Lipovski | |
| 5,758,344 A | * | 5/1998 | Prasad et al. | 1/1 |
| 5,829,024 A | | 10/1998 | Sato | |
| 5,842,040 A | | 11/1998 | Hughes et al. | |
| 5,920,886 A | | 7/1999 | Feldmeier | |

(Continued)

OTHER PUBLICATIONS

Gupta, et al., Packet Classification on Multiple Fields, Proceedings of the Conference on Applications, Technologies, Architecures, and Protocols for Computer Communication, Association of Computing Machinery, (c)1999, pp. 147-160.

(Continued)

*Primary Examiner* — Hosain Alam
*Assistant Examiner* — Eliyah S Harper
(74) *Attorney, Agent, or Firm* — Novak Druce Connolly Bove + Quigg LLP

(57) ABSTRACT

A system and method for efficiently searching long strings of data, such as network messages, is described. The system preferably includes an associative memory structure, having a plurality of content addressable memories (CAMs). The CAMs are hierarchically arranged such the output of at least one CAM is used as the input to a second CAM. Preferably, a top-level CAM receives only a selected portion of the data string or network message as its input. The output of the top-level CAM is then joined with some or all of the remaining portions of the data string to form a new output that is provided to the CAM at the next lower level. The top-level CAM is programmed such that its output is substantially smaller (e.g., has fewer bits) than the selected data string portion that is input to the top-level CAM. The system can thus search data strings that are on the whole far longer than the widths of the respective CAMs forming the memory structure.

23 Claims, 6 Drawing Sheets

(56) References Cited

U.S. PATENT DOCUMENTS

| | | | |
|---|---|---|---|
| 5,930,359 A | | 7/1999 | Kempke et al. |
| 6,041,053 A | * | 3/2000 | Douceur et al. ............. 370/389 |
| 6,055,364 A | | 4/2000 | Speakman et al. |
| 6,101,115 A | | 8/2000 | Ross |
| 6,148,364 A | | 11/2000 | Srinivasan et al. |
| 6,154,741 A | * | 11/2000 | Feldman ............................. 1/1 |
| 6,219,706 B1 | | 4/2001 | Fan et al. |
| 6,289,414 B1 | | 9/2001 | Feldmeier et al. |
| 6,377,577 B1 | | 4/2002 | Bechtolsheim et al. |
| 6,381,673 B1 | | 4/2002 | Srinivasan et al. |
| 6,389,506 B1 | | 5/2002 | Ross et al. |
| 6,389,507 B1 | | 5/2002 | Sherman |
| 6,467,019 B1 | * | 10/2002 | Washburn .................... 711/108 |
| 6,480,931 B1 | | 11/2002 | Buti et al. |
| 6,484,179 B1 | * | 11/2002 | Roccaforte ................... 707/737 |
| 6,487,549 B1 | * | 11/2002 | Amundsen ............................ 1/1 |
| 6,502,089 B1 | * | 12/2002 | Amundsen et al. ........... 707/714 |
| 6,507,835 B1 | * | 1/2003 | Amundsen et al. ................... 1/1 |
| 6,526,474 B1 | | 2/2003 | Ross |
| 6,564,204 B1 | * | 5/2003 | Amundsen et al. ........... 707/714 |
| 6,564,289 B2 | | 5/2003 | Srinivasan et al. |
| 6,574,702 B2 | | 6/2003 | Khanna et al. |
| 6,591,331 B1 | | 7/2003 | Khanna |
| 6,651,096 B1 | | 11/2003 | Gai et al. |
| 6,745,173 B1 | * | 6/2004 | Amundsen ............................ 1/1 |
| 7,020,647 B1 | * | 3/2006 | Egan et al. .................... 707/741 |
| 2001/0032254 A1 | * | 10/2001 | Hawkins ....................... 709/219 |
| 2002/0004917 A1 | * | 1/2002 | Malcolm et al. .................. 714/4 |
| 2002/0109706 A1 | * | 8/2002 | Lincke et al. ................. 345/700 |

OTHER PUBLICATIONS

Sriinvasan, et al., Packet Classification on Using Tuple Space Search, Proceedings of the Conference on Applications, Technologies, Architectures, and Protocols for Computer Communication, Association of Computing Machinery, (c)1999, pp. 135-146.

Lakshman, et al., High-speed Policy-based Packet Forwarding Using Efficient Multi-dimensional Range Matching, Proceedings of the ACM SIGCOMM '98, Conference on Applications, Technologies, Architectures, and Protocols for Computer Communication, (c)1998, pp. 203-214.

Access control List: Overview and Guidelines, http://www.cisco.com/univercd/cc/t...113ed_cr/secur_c/scprt3/scacls.htm., Dec. 21, 1997, pp. 1-7.

Network Node Registry-Access Control Lists, http://www.net.gov.bc.ca/NNR/NNR_AL_doc.html, Apr. 18, 1997, pp. 1-5.

Gupta, Pankaj, Fast Routing Lookup Mechanisms, Seminar on High-speed Switching—Laboratory of Computer Science, MIT, Mar. 16, 1998, pp. 1-31.

Wide Ternary Searches Using MUSIC CAMs and RCPs, Music Semiconductors: Application Note AN-N31, Apr. 13, 1999, pp. 1-8.

\* cited by examiner

FIG. 5

ACL 101 — 318a

| SOURCE ADDRESS | DESTINATION ADDRESS | SOURCE PORT | DESTINATION PORT | PROTOCOL | ACTION |
|---|---|---|---|---|---|
| 1362:2311:0000:0000:0000:4612:X:X | X:X:X:X:X:X:X:X | X | X | X | PERMIT |
| 2992:4612:0000:0000:0000:X:X:X | X:X:X:X:X:X:X:X | 80 | X | X | PERMIT |
| X:X:X:X:2201:8909:3A22:FACA | 2992:4612:0000:0000:0000:X:X:X | X | X | X | DENY |
| 2992:8909:3A22:X:X:X:X:X | X:X:X:X:X:X:X:X | 100 | X | X | PERMIT AND LOG |
| 8526:6951:3698:0000:0000:7412:68DA:5000 | X:X:X:X:X:X:X:X | X | X | X | DENY AND LOG |
| 2113:9182:0000:0000:0000:X:X:X | X:X:X:X:X:X:X:X | X | X | TCP | DENY |
| X:X:X:X:X:X:X:X | X:X:X:X:X:X:X:X | X | X | X | DENY |

502 → row 1, 504 → row 2, 506 → row 3, 508 → row 4, 510 → row 5, 512 → row 6, 514 → row 7

516 SOURCE ADDRESS, 518 DESTINATION ADDRESS, 520 SOURCE PORT, 522 DESTINATION PORT, 524 PROTOCOL, 526 ACTION

HIERARCHICAL ASSOCIATIVE MEMORY-BASED CLASSIFICATION SYSTEM

CROSS-REFERENCE TO RELATED APPLICATIONS

This Divisional Patent Application is a division of U.S. patent application Ser. No. 09/613,039 filed on Jul. 10, 2000, now issued as U.S. Pat. No. 7,051,078 on May 23, 2006.

This application is related to the following co-pending, commonly owned U.S. patent application:

U.S. patent application Ser. No. 09/295,187 entitled, METHOD AND APPARATUS FOR ORGANIZING, STORING AND EVALUATING ACCESS CONTROL LISTS, filed Apr. 20, 1999.

BACKGROUND OF THE INVENTION

1. Field of the Invention

The present invention relates generally to computer networks, and more specifically, to a method and apparatus for configuring an associative memory device to efficiently perform matches against long input strings, such as network messages.

2. Background Information

A computer network typically comprises a plurality of interconnected entities that transmit (i.e., "source") or receive (i.e., "sink") data frames. A common type of computer network is a local area network ("LAN") which typically refers to a privately owned network within a single building or campus. LANs employ a data communication protocol (LAN standard), such as Ethernet, FDDI or Token Ring, that defines the functions performed by the data link and physical layers of a communications architecture (i.e., a protocol stack), such as the Open Systems Interconnection (OSI) Reference Model. In many instances, multiple LANs may be interconnected by network links to form a wide area network ("WAN"), metropolitan area network ("MAN") or intranet. These LANs and/or WANs, moreover, may be coupled through one or more gateways to the well-known Internet.

Each network entity preferably includes network communication software, which may operate in accordance with the Transmission Control Protocol/Internet Protocol (TCP/IP) suite of communication protocols. TCP/IP basically consists of a set of rules defining how entities interact with each other. In particular, TCP/IP defines a series of communication layers, including a transport layer and a network layer. At the transport layer, TCP/IP includes both the User Datagram Protocol (UDP), which is a connectionless transport protocol, and TCP which is a reliable, connection-oriented transport protocol. When a process at one network entity wishes to communicate with another entity, it formulates one or more network messages and passes them to the upper layer of the TCP/IP communication stack. These messages are passed down through each layer of the stack where they are encapsulated into segments, packets and frames. Each layer also adds information in the form of a header to the messages. The frames are then transmitted over the network links as bits. At the destination entity, the bits are reassembled and passed up the layers of the destination entity's communication stack. At each layer, the corresponding message headers are stripped off, thereby recovering the original network message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving network messages at a source port and transferring them to at least one destination port for receipt by another entity. Switches may operate at various levels of the communication stack. For example, a switch may operate at layer 2, which, in the OSI Reference Model, is called the data link layer and includes both the Logical Link Control (LLC) and Media Access Control (MAC) sub-layers.

Other intermediate devices, commonly referred to as routers, may operate at higher communication layers, such as layer 3, which in TCP/IP networks corresponds to the Internet Protocol (IP) layer. IP message packets include a corresponding header which contains an IP source address and an IP destination address. Routers or layer 3 switches may re-assemble or convert received data frames from one LAN standard (e.g., Ethernet) to another (e.g. Token Ring). Thus, layer 3 devices are often used to interconnect dissimilar subnetworks. Some layer 3 devices may also examine the transport layer headers of received messages to identify the corresponding TCP or UDP port numbers being utilized by the corresponding network entities. Such extended-capability devices are often referred to as Layer 4, Layer 5, Layer 6 or Layer 7 switches or as Network Appliances. Many applications are assigned specific, fixed TCP and/or UDP port numbers in accordance with Request for Comments (RFC) 1700. For example, TCP/UDP port number 80 corresponds to the hyper text transport protocol (HTTP), while port number 21 corresponds to file transfer protocol (ftp) service.

FIG. 1 is a partial block diagram of a conventional Transport Layer segment 100 corresponding to the TCP protocol in which a Network Layer packet 102 corresponding to the IP protocol is encapsulated. Segment 100 includes a TCP header portion 104 that includes a plurality of fields. In particular, TCP header 104 includes a source port field 106 and a destination port field 108, among others. IP packet 102 similarly includes an IP header portion 110 that also comprises a plurality of fields. Specifically, IP header 110 includes an IP source address (SA) field 112, an IP destination address (DA) field 114, and a protocol field 116. IP packet 102, and thus segment 100, further includes a data portion 118. Headers 104 and 110 basically identify the local end points of the connection between the communicating entities and may also specify certain flow information.

Access Control Lists

Some networking software, including the Internetwork Operating System (IOS®) from Cisco Systems, Inc. of San Jose, Calif., supports the creation of access control lists or filters. These access control lists are typically used to prevent certain traffic from entering or exiting a network. In particular, a layer 3 device may utilize an access control list to decide whether a received message should be forwarded or filtered (i.e., dropped) based on certain predefined criteria. The criteria may be IP source address, IP destination address, or upper-layer application based on TCP/UDP port numbers. For example, an access control list may allow e-mail to be forwarded, but cause all Telnet traffic to be dropped. Access control lists may be established for both inbound and outbound traffic and are most commonly configured at border devices (i.e., gateways or firewalls).

To generate an access control list, a network administrator typically defines a sequence of criteria statements using a conventional text editor or graphical user interface (GUI). As each subsequent statement is defined, it is appended to the end of the list. The completed list is then downloaded to the desired layer 3 device where it may be stored in the device's non-volatile RAM (NVRAM) typically as a linked list. Upon initialization, the device copies the access control list to its dynamic memory. When a packet is subsequently received at a given interface of the device, a software module of IOS® tests the received packet against each criteria statement in the list. That is, the statements are checked in the order presented by the list. Once a match is found, the corresponding decision or action (e.g., permit or deny) is returned and applied to the packet. In other words, following the first match, no more criteria statements are checked. Accordingly, at the end of each access control list a "deny all traffic" statement is often added. Thus, if a given packet does not match any of the criteria statements, the packet will be discarded.

As indicated above, access control lists are used primarily to provide security. Thus, for a given interface, only a single list is evaluated per direction. The lists, moreover, are relatively short. Nevertheless, the evaluation of such lists by software modules can significantly degrade the intermediate device's performance (e.g., number of packets processed per second). This degradation in performance has been accepted mainly due to a lack of acceptable alternatives. It is proposed, however, to expand the use of access control lists for additional features besides just security decisions. For example, access control lists may also be used to determine whether a given packet should be encrypted and/or whether a particular quality of service (QoS) treatment should be applied. Accordingly, it is anticipated that multiple access control lists may be assigned to a single interface. As additional access control lists are defined and evaluated per packet, the reduction in performance will likely reach unacceptable levels.

To improve performance, some devices store access control lists in an associative memory, such as a ternary content addressable memory (TCAM). TCAM suppliers currently make TCAMs up to 144 bits in width. This has proven acceptable because the total number of bits being evaluated is on the order of 133. In particular, the message fields currently being evaluated by access control lists (i.e., the criteria) include IP source address, IP destination address, protocol, TCP/UDP source port, TCP/UDP destination port, virtual local area network (VLAN) identifier, differentiated services codepoint (DSCP), and the physical port on which the message was received. With version 4 of the Internet Protocol (IPv4), source and destination addresses are 32 bits in length. Accordingly, the above information, typically referred to as the flow label, adds up to approximately 133 bits, which is less than the width of available TCAMs.

With version 6 of the Internet Protocol (IPv6), however, network layer addresses are now 128 bits long. Assuming the same fields are to be evaluated, the flow labels being evaluated are now approximately 336 bits long, which is more than twice the size of current TCAMs. It is also proposed to evaluate higher-level messages, e.g., up to layer 7, which is the application layer. This would further increase the amount of information, and thus the number of bits, being evaluated. Technical limitations, however, currently prevent TCAMs from being built to widths on the order of 336 bits. Even if they could be built, such large TCAMs would likely have substantial power requirements and would thus be highly inefficient.

Accordingly, a need exists for a mechanism that can search long strings of data (e.g., 366 bits or more) at relatively high-speed.

SUMMARY OF THE INVENTION

Briefly, the invention relates to a system and method for efficiently classifying long strings of data, such as network messages, by matching them. The system includes a hierarchically arranged memory structure. In the illustrative embodiment, the memory structure includes a plurality of ternary content addressable memories (TCAMs), which are themselves hierarchically arranged. The TCAMs are programmed in a novel manner with the data to be matched, such as the predefined statements of one or more access control lists (ACLs), so as to allow messages that are longer than the width of the TCAMs to nonetheless be matched. In operation, a given network message is provided (e.g., input) to the hierarchical TCAMs and the particular action to be applied to that message, as specified by the matching ACL statement, is returned.

The hierarchical TCAMs include a top-level TCAM and at least one next-level TCAM. Each TCAM, moreover, may be associated with another memory device, such as a random access memory (RAM) having the same number of entries as its associated TCAM. According to the invention, the top-level TCAM is configured only to receive and match one or more sub-fields of the network message. In the illustrative embodiment, the longest sub-field(s) of the message (e.g., the network layer addresses) are selected for matching within the top-level TCAM. A match within the top-level TCAM specifies a corresponding record of its associated RAM. This record is programmed to contain an identifier that relates to, but is substantially shorter than, the sub-field that was searched (i.e., the network layer address). This identifier is then input into the next-level TCAM along with the remaining sub-fields of the message. A match within the next-level TCAM similarly specifies a corresponding record within its associated RAM. This record preferably specifies the particular action (e.g., drop, forward, encrypt, etc.) that is to be applied to the network message.

BRIEF DESCRIPTION OF THE DRAWINGS

The invention description below refers to the accompanying drawings, of which:

FIG. 5 is an illustration of an exemplary access control list; and

DETAILED DESCRIPTION OF AN ILLUSTRATIVE EMBODIMENT

Figure 1:
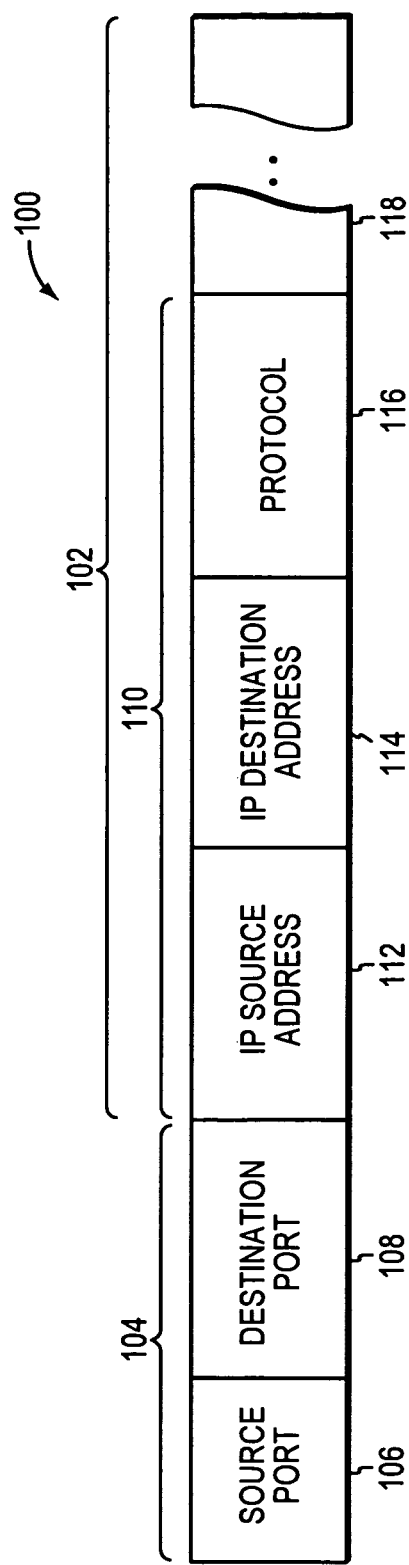
FIG. 1, previously discussed, is a block diagram of a conventional network message.
Figure 2:
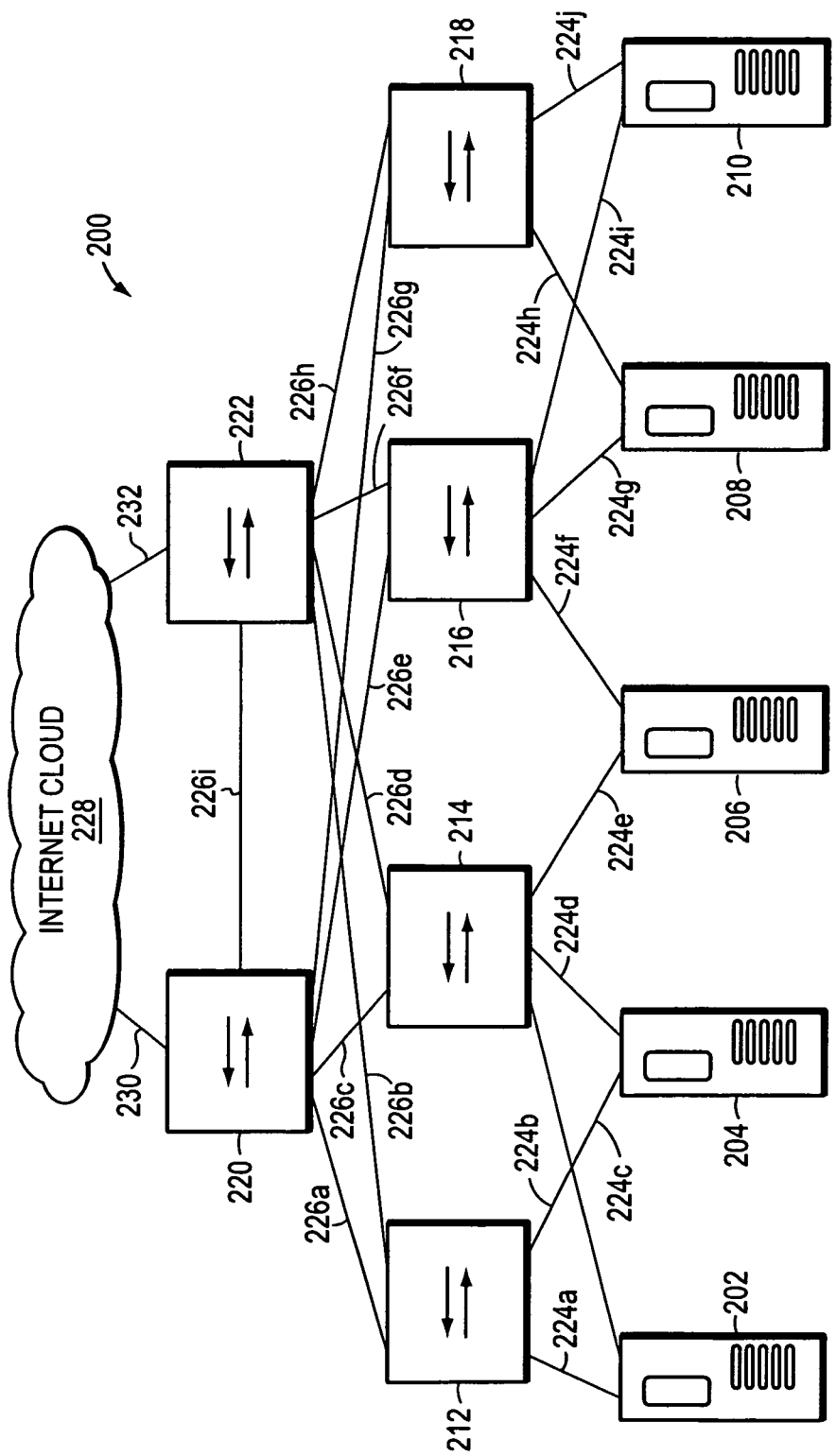
FIG. 2 is a highly schematic block diagram of a computer network.

FIG. 2 is a highly schematic illustration of a computer network 200. The network 200 includes a plurality of servers 202-210 and a plurality of intermediate network devices 212-222, such as backbone routers, high-speed switches, etc. Each server 202-210 is preferably coupled to two or more of the devices 212-222 by respective trunks or links 224*a-j*. Server 202, for example, is coupled to device 212 by link 224*a*, and to device 214 by link 224*b*. The devices 212-222 are similarly interconnected with each other by another set of trunks or links 226a-i. Significantly, the network 200 is also coupled to the well-known Internet, which may be represented by an Internet cloud 228. In particular, device 220 is coupled to the Internet 228 by link 230, and device 222 is coupled to the Internet 228 by link 232. Accordingly, network 200 allows users (not shown) who may be coupled to Internet cloud 228 through other networks or connections, to access any of the servers 202-210 and retrieve information posted on those servers 202-210.

It should be understood that the configuration of network 200 is meant for illustrative purposes only, and that the present invention will operate with other, possibly far more complex, network designs or topologies.

Figure 3:
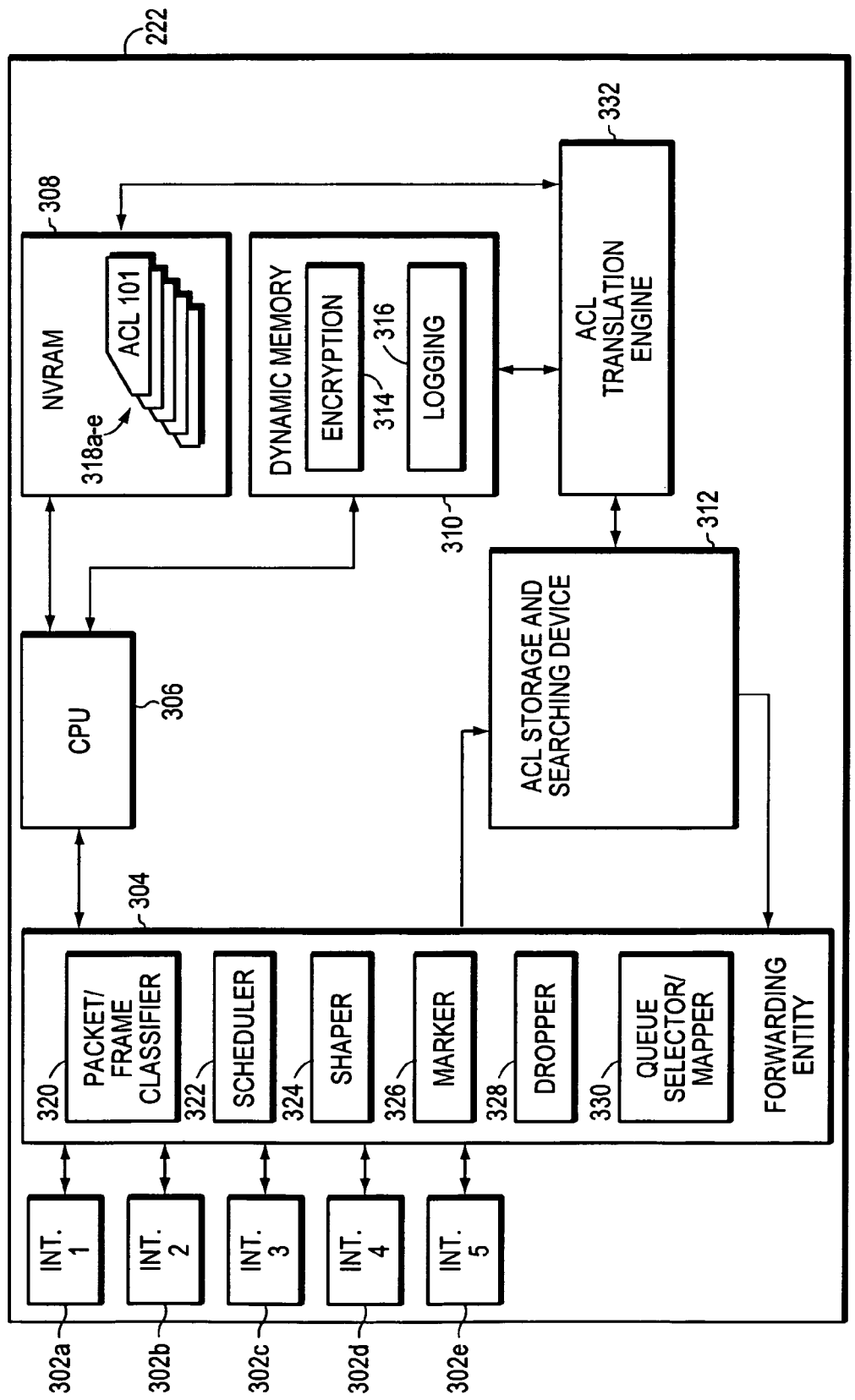
FIG. 3 is a partial, functional block diagram of an intermediate network device in accordance with the present invention.

FIG. 3 is a partial block diagram of intermediate network device 222. Device 222 preferably includes a plurality of interfaces 302a-302e that provide connectivity to the network 200 and the Internet 228. That is, interfaces 302a-302e are in communication with servers 202-210 and Internet 228. Each interface 302a-e, moreover, may be associated with one or more physical ports (not shown). Device 222 further includes at least one forwarding entity 304, a central processing unit (CPU) 306, non-volatile random access memory (NVRAM) 308, dynamic memory 310 and an Access Control List (ACL) storage and searching device 312. CPU 306 is coupled to both the NVRAM 308 and also to dynamic memory 310. NVRAM 308 may contain one or more text-based access control lists (ACLs) 318a-318e. Dynamic memory 310 may contain a plurality of applications or other programs, such as an encryption-function 314 and a logging function 316, that may be executed by CPU 306.

Forwarding entity 304 may include a plurality of conventional sub-components configured to implement quality of service (QoS) treatments, such as a packet/frame classifier 320, a scheduler 322, a shaper 324, a marker 326, a dropper 328, and a queue selector/mapper 330. The forwarding entity 304 is also coupled to the CPU 306 and the ACL storage and searching device 312. As described below, the forwarding entity 304 is basically configured to forward or switch network messages among the various interfaces 302a-e of device 222.

Device 222 may further include an access control list (ACL) translation engine 332. ACL engine 332 is operatively coupled to NVRAM 308 for accessing the text-based ACLs 318a-e, dynamic memory 310 for processing the ACLs 318-e, and to ACL storage and searching device 312 for storing modified versions of the ACLs 318a-e therein, as described below. ACL translation engine 332 preferably comprises computer readable media containing executable software programs, such as software modules or libraries, pertaining to the methods described herein.

It should be understood that ACL translation engine 332 may be stored at dynamic memory 310 and run on or otherwise be executed by CPU 306 or some other processing element (not shown). Engine 332 may also be implemented in hardware through a plurality of registers and combinational logic configured to produce sequential logic circuits and cooperating state machines. Those skilled in the art will recognize that other combinations of software and hardware implementations may be utilized.

A suitable platform for intermediate network device 222 are the Catalyst 4000 switches, Catalyst 8500® series of switch routers, and/or the Catalyst® 6000 family of multi-layer switches all from Cisco Systems, Inc. of San Jose, Calif.

Figure 4:
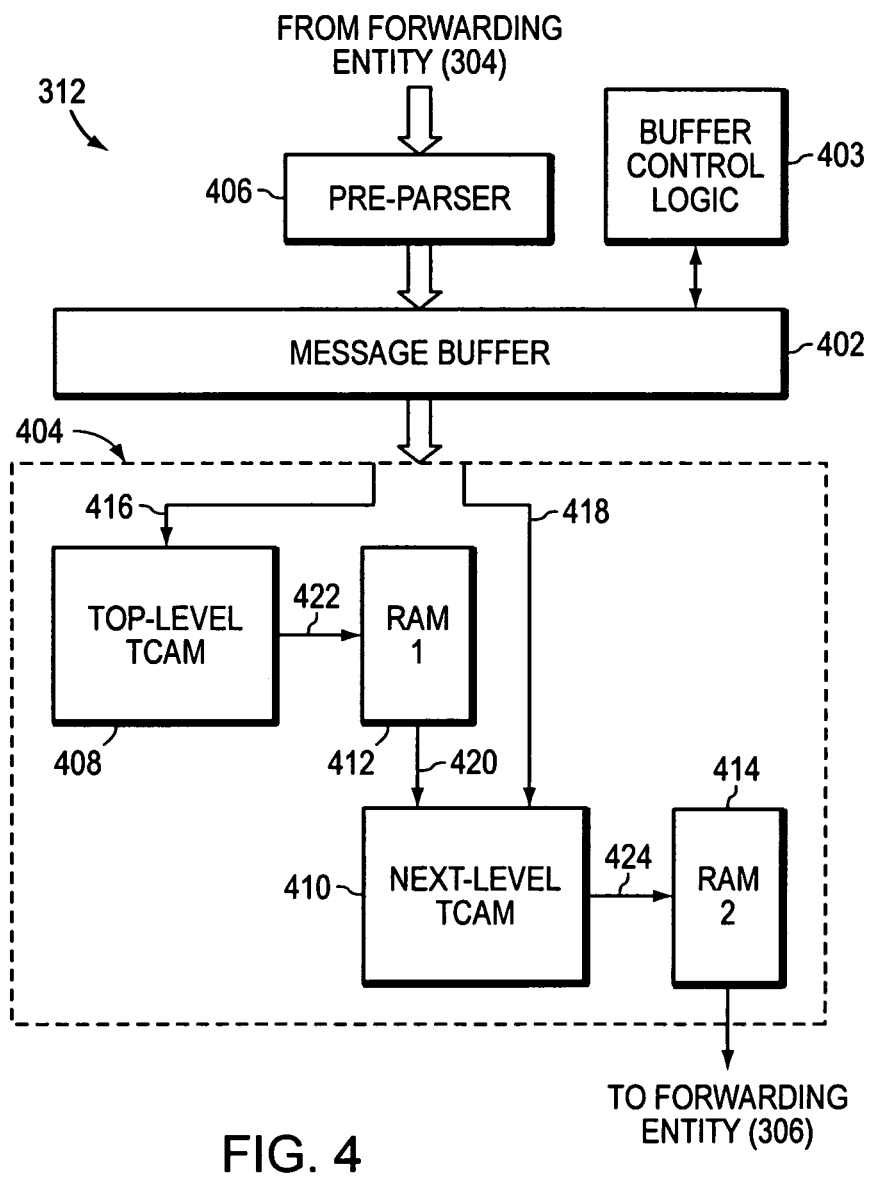
FIG. 4 is a highly schematic block diagram of the hierarchical, associative memory structure of the device of FIG. 3.

FIG. 4 is a highly schematic illustration of the ACL storage and searching device 312. ACL device 312 includes a message buffer 402, buffer control logic 403 and a hierarchically arranged associative memory structure 404. Device 312 may also include pre-parser logic 406. The associative memory structure 404 is preferably formed from a plurality of ternary content addressable memories (TCAMs) that are themselves hierarchically arranged, such that there is a top-level TCAM 408, and least one next level TCAM 410. Each TCAM 408, 410, moreover, may include another memory structure to which the respective TCAM 408, 410 is coupled. In the illustrative embodiment, top-level TCAM 408 is coupled to a first random access memory (RAM) 412, while next level TCAM 410 is coupled to a second RAM 414. Each TCAM 408, 410 has a plurality of entries and each entry is made up of a plurality of cells. The cells of the TCAMs 408, 410, moreover, are associated with or assigned one of three possible values (e.g., "0", "1" or "don't care"). Each RAM 412, 414 includes a plurality of records, such that each TCAM entry specifies a particular record in its associated RAM.

The preparser logic 406 is coupled to the forwarding entity 304 (FIG. 3) so as to receive messages therefrom. Preparser logic 406 is configured to extract one or more fields from the message which may then be temporarily stored in the message buffer 402. For example, preparser logic 406 may be configured to generate a desired flow label by extracting the contents of the destination and source ports, IP SA, IP DA and protocol fields, as well as the VLAN ID, DSCP and physical port on which the respective message was received. All of this information is preferably passed to and temporarily stored by the message buffer 402. Under the control of buffer control logic 403, the message buffer 402, in turn, supplies one or more of these fields to the top-level TCAM 408, and the remaining fields to the next-level TCAM 410, as illustrated by arrows 416 and 418, respectively. The output of each TCAM of the hierarchical memory structure 404 is preferably provided to its respective RAM, as illustrated by arrows 422 and 424. The output of first RAM 412 is supplied to the next level TCAM 410, as illustrated by arrow 420, while the output of second RAM 414 is returned to the forwarding entity 304.

As shown, the memory structure 404 is hierarchically arranged in that the output from at least one TCAM (e.g., the top-level TCAM 408) is provided as an input to another TCAM (e.g., the next level TCAM 410). In the illustrative embodiment, the top-level TCAM 408 is used to search one or more of the longer fields of the subject message (such as the IP DA and IP SA fields). When a match is located within the top-level TCAM 408, it specifies a corresponding entry in the first RAM 412 that contains an identifier that is related to the respective field. The identifier from the first RAM 412 is then input to the next level TCAM 410 along with the remaining fields of the subject message. Significantly, the identifier from the first RAM 412 is substantially shorter (has far fewer bits) than the field that was supplied to the top-level TCAM 408.

The top and next level TCAMs 408, 410 preferably have 512 k or more rows and a length of 144 bits. A suitable TCAM for use with the present invention is described in co-pending U.S. patent application Ser. No. 09/130,890, filed Aug. 7, 1998, which is hereby incorporated by reference in its entirety. Other TCAMs that can be used with the present invention are commercially available from NetLogic Microsystems, Inc. of Mountain View, Calif. or from Music Semiconductors of Hackettstown, N.J. The TCAMs and their associated RAMs may be either static or dynamic.

Although the preferred embodiment of the memory structure 404 is described as a plurality of hierarchically arranged TCAMs, those skilled in the art to which the invention pertains will recognize that any associative memory devices, such as binary content addressable memories (CAMs), hash tables, etc., may be employed to achieve the advantages of the present invention. Binary CAMs, for example, only support exact matching. They do not allow for "don't care" values.

Creation and Assignment of ACLs to Interfaces

First, a network administrator creates one or more access control lists in a conventional manner. For example, the administrator preferably utilizes a conventional text editor at a management station (not shown) to create the access control lists. FIG. 5 is a highly schematic representation of text-based ACL 318a. Each access control list, such as ACL 318a, is given a name, such as ACL 101, and is preferably arranged in a table array having multiple rows and columns. Each row of the ACL, such as ACL 318a, corresponds to an Access Control Entry (ACE) statement, such as ACE statements 502-514, which specify the various criteria for the ACL 318a. The columns of the ACL represent the specific criteria with which network messages are compared. For example, ACL 318a includes a separate column for IP source address 516, IP destination address 518, TCP/UDP source port 520, TCP/UDP destination port 522 and transport protocol 524. Those skilled in the art will understand that additional message criteria (such as VLAN ID, DSCP, physical port, etc.) may advantageously be employed. ACL 318a further includes an action column 526 that corresponds to the particular action that is to be applied to network messages matching a corresponding ACE statement. Exemplary actions include permit, deny, permit and log, and deny and log, although other actions may be specified. For example, a possible action may be to execute a particular program stored in the non-volatile or dynamic memories of the respective device.

The text-based ACLs that are to be utilized at a given intermediate device are then downloaded to that device in a conventional manner and stored, preferably in non-volatile memory. In particular, the ACLs may be maintained in memory as ASCII text or in other formats. For example, ACLs 318a-318e may be downloaded to device 222 by the network administrator and stored at NVRAM 308. Next, the network administrator preferably assigns one or more ACLs 318a-e to each interface 302a-e per direction (e.g., inbound or outbound).

For example, the network administrator may assign ACL 318a (ACL 101) to interface 302a for purposes of input security control. Accordingly, upon receipt of a network message at interface 302a, it is compared with ACE statements 502-514 of ACL 318a. As described below, the matching is preferably performed as a series of sequential steps starting with the first ACE 502 and moving, one ACE at a time, toward the last ACE 514 in the ACL. Once a match is located, the corresponding action is returned and the processing stops. That is, no additional ACEs are examined. If a match is made with an ACE statement having a "permit" action (e.g., ACE 502), the packet is forwarded. If a match is made with an ACE statement having a "deny" action (e.g., ACE 506), the packet is dropped. If the matching action is "permit and log", then the respective message is forwarded and an entry is made in a conventional message log. Similarly, if the matching action is "deny and log", then the respective message is dropped and a log entry made. If no ACE of the subject ACL matches the message, an implicit action located at the end of the ACL, e.g., ACE 514, is typically returned (e.g., permit or deny).

The value "x" of ACL 318a corresponds to a don't care condition. That is, the specified action is independent of the value at each "x" position of the message being tested. To define don't cares, an address (or other criteria) is typically supplied along with a "mask". The mask specifies which bits are significant and which are don't cares.

Programming the Hierarchical Associative Memory Structure

Figure 6:
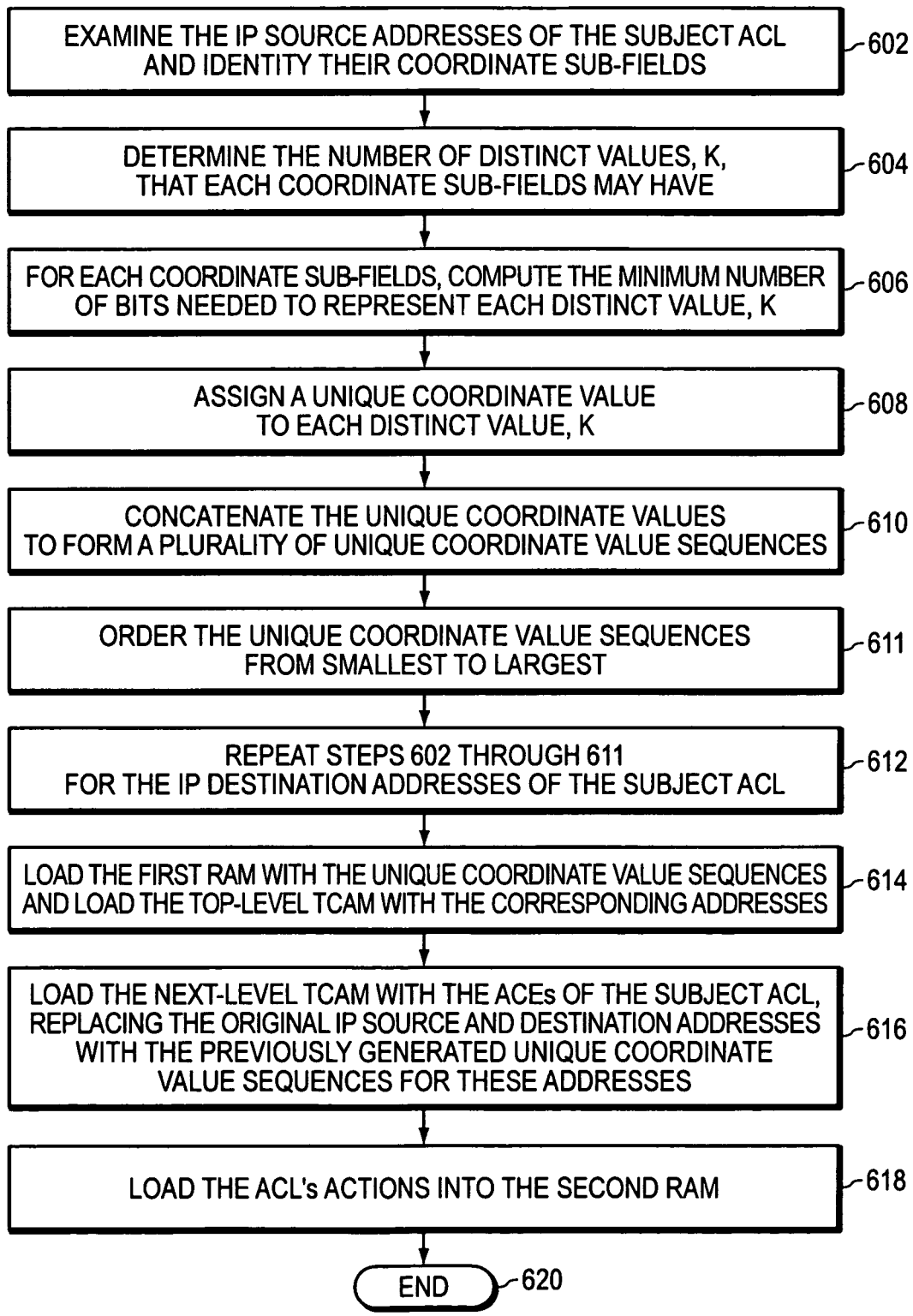
FIG. 6 is a flow diagram of the preferred method of the present invention.

FIG. 6 is a flow diagram of the steps used in programming the hierarchical memory 404 with the ACEs of a selected ACL, such as ACL 318a. As described above, with IPv6, the IP source address and IP destination address fields are each 128 bits long, the TCP/UDP source and destination port fields are each 16 bits long and the transport protocol field is 8 bits long. The total number of bits, namely 296, far exceeds the width of most commercially available TCAMs. Furthermore, if additional fields are to be evaluated, such as VLAN ID, DSCP and physical port, the problem only becomes worse. As described herein, the present invention provides a solution to searching long strings, such as the flow labels of IPv6 TCP/IP messages.

As indicated above, the IP source and destination address fields are the longest fields of the flow label. In the illustrative embodiment, it is these fields that are selected for programming into the top-level TCAM 408, while the remaining fields are programmed into the next level TCAM 410. Since the TCAMs 408, 410 only return the first matching entry for a given input, the order in which the addresses and ACEs are programmed into the TCAMs 408, 410 is important. As a general proposition, more specific ACEs should be placed ahead of less specific ACEs. In other words, ACEs with large numbers of don't cares should generally be placed into lower entries of the TCAMs 408, 410, so that more specific entries may be matched first.

As shown at block 602, one of the first steps in programming the top-level TCAM 408 is to examine all of the IP source addresses of the ACL and to identify "coordinate sub-fields". A coordinate subfield is basically a range of bit positions such that, for all of the IP source addresses, and/or destination addresses as the case may be, within the ACL, each IP address has either a specific value for the entire bit range or has all don't care values for the entire bit range.

ACL 318a (FIG. 5), for example, includes the following six IPv6 source addresses in hexadecimal format:

(1) 1362:2311:0000:0000:0000:4612:XXXX:XXXX
(2) 2992:4612:0000:0000:XXXX:XXXX:XXXX:XXXX
(3) XXXX:XXXX:XXXX:XXXX:2201:8909:3A22:FACA
(4) 2992:8909:3A22:XXXX:XXXX:XXXX:XXXX:XXXX
(5) 8526:6951:3698:0000:0000:7412:68DA:5000
(6) 2113:9182:0000:0000:XXXX:XXXX:XXXX:XXXX

The six IPv6 source addresses of ACL 318a have four sub-fields. Specifically, assuming the addresses have a bit range of 127-0 from left to right, a first sub-field corresponds to the bit range 127-80, since all six source addresses have either a specific value across this entire range or all don't cares across the entire range. A second sub-field corresponds to the bit range of 79-64. A third sub-field corresponds to the bit range 63-32. A fourth sub-field corresponds to the bit range 31-0. For each of the addresses, the values within each sub-field are either all specific values or all don't care values (i.e., "Xs").

As indicated at block 604, the next step is to determine the number of distinct values, K, that each coordinate sub-field may have. The first sub-field, for example, has the following five distinct values:

1362:2311:0000
2992:4612:0000
2992:8909:3A22
8526:6951:3698
2113:9182:0000 plus an "other" value (i.e., XXXX:XXXX:XXXX). The second sub-field has one distinct value and an other value. The third sub-field has four distinct values and an other value. The fourth sub-field has two distinct values and an other value. After determining the number of distinct values, K, the next step is to compute the minimum number of bits needed to represent each distinct value, K, for each coordinate subfield, as indicated at block 606. This may be accomplished by using the following algorithm:

$\log_2(K+1)$ assuming an "other" value is also possible. Applying this algorithm, we find that the minimum number of bits needed to represent the five distinct and other values of the first sub-field is three. The number of bits needed to represent the second sub-field is one. The number of bits needed for both the third and the fourth sub-fields is two.

Next, for each sub-field, a "unique coordinate value" (UCV) is assigned to each distinct and other value K within that sub-field, as indicated at block 608. Considering the first sub-field, for example, there are five distinct values as well as an other value, and these values are to be represented with three bits. The distinct value "1362:2311:0000" may be assigned to UCV "000". The distinct value "2992:4612:0000" may be assigned to UCV "001". The distinct value "2992:8909:3A22" may be assigned to UCV "010". The distinct value "8526:6951:3698" may be assigned to UCV "011". The distinct value "2113:9182:0000" may be assigned to UCV "100". The other value "XXXX:XXXX:XXXX" may be assigned to UCV "101".

The distinct and other values of the remaining sub-fields may be assigned to the following unique coordinate values:

| Sub-field | Distinct Value | Unique Coordinate Value |
| --- | --- | --- |
| 2 | 0 | 0 |
| 2 | other | 1 |
| 3 | 0:4612 | 00 |
| 3 | 2201:8909 | 01 |
| 3 | 0:7412 | 10 |
| 3 | other | 11 |
| 4 | 3A22:FACA | 00 |
| 4 | 68DA:5000 | 01 |
| 4 | other | 10 |

As shown, the "other" values are preferably assigned the largest or highest UCV within the given range.

The UCVs are then concatenated to form a plurality of "unique coordinate value sequences" (UCVSs), as indicated at step 610. Continuing with the above example, the first, second, third and fourth sub-fields are represented by 5, 2, 4 and 3 UCVs, respectively. Accordingly, there are 5*2*4*3 or 120 possible UCVSs that can be formed by concatenating these UCVs. Each UCVS will correspond to an IPv6 address, and many of the UCVSs will correspond to an actual IP source address specified in ACL 318*a* (FIG. 5). For example, UCVS "00000010" corresponds to the first IPv6 source address in ACL 318*a*, 1362:2311:0000:0000:0000:4612: XXXX:XXXX. UCVS "00101110" corresponds to the second address, 2992:4612:0000:0000:XXXX:XXXX:XXXX: XXXX, UCVS "101101000" corresponds to the third address, XXXX:XXXX:XXXX:XXXX:2201:8909:3A22: FACA, and so on. The UCVSs are then ordered from smallest (e.g., 00000000) to largest (e.g., 10111110), as indicated at step 611. Since each "other" value was assigned the largest UCV in the given range, the ordering of UCVSs from smallest to largest will place the more specific UCVSs first. In particular, UCVS "00000000" corresponds to very specific IPv6 source address, namely 1362:2311:0000:0000:0000:4612: 3A22:FACA, while UCVS "10110100" corresponds to a less specific address, namely XXXX:XXXX:XXXX:XXXX: 2201:8909:3A22:FACA, and UCVS "10111110" corresponds to address XXXX:XXXX:XXXX:XXXX:XXXX: XXXX:XXXX:XXXX.

As indicated at block 612, steps 602-611 are then preferably repeated for the IP destination addresses of ACL 318*a*.

The top-level TCAM 408 is then loaded with IP addresses, while the first RAM 412 is loaded with the corresponding UCVSs, as indicated at block 614. The top-level TCAM 408 is preferably loaded with IP addresses such that the corresponding UCVSs go from smallest to largest (i.e., in increasing order). For example, the first row of the top-level TCAM 408 is loaded with IP source address 1362:2311:0000:0000: 0000:4612:3A22:FACA, which corresponds to the smallest UCVS (i.e., 00000000), and this UCVS, moreover, is loaded in the particular record at the first RAM 412 that is associated with the first row of TCAM 408. Thus, a match to this row of the top-level TCAM 408 will cause the first RAM to output the value 00000000. This process is repeated until all of the UCVSs and the corresponding addresses have been loaded into the first RAM 412 and the top-level TCAM 408.

It should be understood that when an IP address having a sub-field of XXXX (i.e., don't cares), then the mask for the cells of that particular sub-field is set to indicate that the cells are don't cares.

Each row of TCAM 408 preferably includes an additional bit or cell that is used to indicate whether the UCVS associated with that row is a source or destination address. For example, if this cell is asserted, then the UCVS is associated with a source address. If the cell is de-asserted, then the UCVS is associated with a destination address. Alternatively, the computation of UCVs and UCVSs may be made across the entire set of source and destination addresses simultaneously. In another embodiment, a first top-level TCAM and associated RAM could be used for IP source addresses while a second top-level TCAM and associated RAM is used for IP destination addresses.

As shown, each of the 128-bit IPv6 source and destination addresses of the ACL 318*a* has been reduced to just 8 bits.

The next level TCAM 410 is then loaded with the criteria fields (i.e., columns 516-524) of the ACEs 502-514 of ACL 318*a*, but with the source and destination IPv6 address fields from columns 516 and 518 replaced with their corresponding UCV-concatenated (i.e., UCVS) versions with the TCAM mask set to don't care for each UCV sub-field of the UCVS that corresponds to "other" values, as indicated at step 616. For example, when UCVS "00101110", which corresponds to IPv6 address 2992:4612:0000:0000:XXXX:XXXX: XXXX:XXXX, is loaded into the next level TCAM 410, the mask for the last four bit positions (i.e., "1110") is set to don't care. The ACL actions from column 526 are then loaded into second RAM 414, as indicated at block 618. The hierarchical memory structure 404 is now fully programmed as indicated by end block 620, and may be utilized by device 222 to evaluate messages.

For example, suppose that device 222 receives a network message on interface 302*a* that originated from the Internet cloud 228. The message is passed to the forwarding entity 304 which provides it to the ACL storage and searching device 312. At the ACL storage and searching device 312, the pre-parser 406 extracts the relevant fields for generating a flow label and temporarily stores this flow label in the message buffer 402. The buffer control logic 403 then directs the message buffer 402 to input the IP source and destination addresses from the flow label into the top-level TCAM 408 either simultaneously or sequentially via arrow 416.

If the top-level TCAM 408 detects a match to the input address, a corresponding record in the first RAM 412 is specified, as shown by arrow 422. As discussed above, this record contains the UCVS derived for the matching address. Furthermore, although the input address may have been 128 bits long, the corresponding UCVS is far shorter (i.e., only 8 bits long). The UCVS for both the IP source address and the IP destination address are then input to the next-level TCAM 410 via arrow 420. Buffer control logic 403 also directs the message buffer 402 to input the remaining fields from the flow label (e.g., TCP/UDP source and destination ports, protocol, VLAN ID, DSCP, and physical port) into the next-level TCAM 410 via arrow 418. Since the IP source and destination addresses have been effectively translated into their much shorter UCVSs, all of this data is now able to fit within the width of the next-level TCAM 410.

If the next-level TCAM 410 detects a match to the flow label, a corresponding record in the second RAM 414 is specified, as shown by arrow 424. As discussed above, this record contains the action for the message. This action is then passed by the second RAM 414 to the forwarding entity 304 which carries out the specified action (e.g., permit, drop, permit and log, drop and log, etc.) on the message.

To improve performance, the hierarchical memory structure 404 may be utilized to examine two or more messages substantially simultaneously. More specifically, at the same time that the UCVSs and remaining fields corresponding to the flow label of a first message are being used to search the next level TCAM 410, the IP addresses from the flow label of a second message may be input into the top-level TCAM 408 in order to identify their corresponding UCVSs. In this embodiment, there may be multiple message buffers, buffer controls and pre-parser logic circuits.

It should be understood that the length of the UCVSs for an ACL having more entries than ACL 318*a* may be significantly greater than 8 bits. In a preferred embodiment, UCV sequences on the order of 32 bits in length are derived and utilized within ACL storage and searching device 312 in the manner described above.

It should be further understood that the translation of IP addresses to their UCVSs and the subsequent programming of the ACL storage and searching device 312, as described above with reference to FIG. 6, may be performed remotely from device 222. For example, these functions may be performed at a management station and the results remotely programmed into the ACL storage and searching device 312. In this case, there would be no need for the device 222 to include an ACL translation engine 332.

Depending on the length of the data string being searched, moreover, the hierarchical associative memory 404 may contain additional TCAM levels. In other words, the output of next-level TCAM 410 may be input to yet another TCAM along with still further fields from the message buffer, and so on. At each level (except for the last and final level), one or more fields of the data string are converted to their corresponding UCVSs for inputting into the next lower TCAM. As a result, the hierarchical associative memory 404 of the present invention may be able to search data strings that are far longer than the individual TCAMs are wide.

It should also be understood that the output of the top-level (or any other) TCAM may be processed (e.g., subjected to some algebraic expression or function), thereby generating some new value that is input to the next-level TCAM. In other words, the output of one TCAM may be directly or, as described here, indirectly coupled to the next-level TCAM. Similarly, one or more fields of the data string may be pre-processed generating a derived value which is then input to the top-level (or any other) TCAM. Thus, the inputs to a TCAM level may consist of any combination of: the output of a higher level TCAM, the processed output of a higher level TCAM, one or more fields of the data string, and one or more values derived from one or more fields of the data string.

The foregoing description has been directed to specific embodiments of this invention. It will be apparent, however, that other variations and modifications may be made to the described embodiments, with the attainment of some or all of their advantages. For example, the techniques of the present invention may be applied to searching other long data strings such as URLs or other data records or files within an associative memory structure. Therefore, it is an object of the appended claims to cover all such variations and modifications as come within the true spirit and scope of the invention.

What is claimed is:

1. A method comprising:
providing a hierarchical, associative memory structure;
examining a plurality of addresses of network devices and identifying coordinate sub-fields of the addresses, each address including a plurality of bit positions, each coordinate sub-field being a range of bit positions within the addresses where the bit positions in each address hold either a distinct value for the entire range of bit positions or a don't care value for the entire range of bit positions, wherein the plurality of addresses include Internet Protocol (IP) addresses in hexadecimal format;
determining the number of distinct values represented in each coordinate sub-field of the addresses;
for each coordinate sub-field of the addresses, computing a minimum number of bits needed to represent the number of distinct values and a don't care value, if present;
assigning a unique coordinate value (UCV), that falls within the previously computed minimum number of bits, for each distinct value and the don't care value, if present, with each UCV being shorter than the corresponding value that the UCV replaces;
for each address, generating a unique coordinate value sequence (UCVS) by concatenating the UCVs assigned to the distinct values and the don't care value, if present, of the respective address; and
loading the hierarchical, associative memory structure with the generated UCVSs.

2. The method of claim 1 wherein the addresses are from access control entries (ACEs) of at least one access control list (ACL).

3. An apparatus comprising:
a hierarchical, associative memory structure;
means for examining a plurality of addresses of network devices and identifying coordinate sub-fields of the addresses, each address including a plurality of bit positions, each coordinate sub-field being a range of bit positions within the addresses where the bit positions in each address hold either a distinct value for the entire range of bit positions or a don't care value for the entire range of bit positions, wherein the plurality of addresses include Internet Protocol (IP) addresses in hexadecimal format;
means for determining the number of distinct values represented in each coordinate sub-field of the addresses;
means for computing, for each coordinate sub-field of the addresses, a minimum number of bits needed to represent the number of distinct values and a don't care value, if present;

means for assigning a unique coordinate value (UCV), that falls within the previously computed minimum number of bits, for each distinct value and the don't care value, if present, with each UCV being shorter than the corresponding value that the UCV replaces; and means for generating, for each address, a unique coordinate value sequence (UCVS) by concatenating the UCVs assigned to the distinct values and the don't care value, if present, of the respective address;

wherein the hierarchical, associative memory is configured to store the generated UCVSs.

4. A non-transitory computer readable medium containing executable program instructions, the executable program instructions comprising instructions for:

examining a plurality of addresses of network devices and identifying coordinate sub-fields of the addresses, each address including a plurality of bit positions, each coordinate sub-field being a range of bit positions within the addresses where the bit positions in each address hold either a distinct value for the entire range of bit positions or a don't care value for the entire range of bit positions, wherein the plurality of addresses include Internet Protocol (IP) addresses in hexadecimal format;

determining the number of distinct values represented in each coordinate sub-field of the addresses;

for each coordinate sub-field of the addresses, computing a minimum number of bits needed to represent the number of distinct values and a don't care value, if present;

assigning a unique coordinate value (UCV), that falls within the previously computed minimum number of bits, for each distinct value and the don't care value, if present, with each UCV being shorter than the corresponding value that the UCV replaces;

for each address, generating a unique coordinate value sequence (UCVS) by concatenating the UCVs assigned to the distinct values and the don't care value, if present, of the respective address; and loading a hierarchical, associative memory structure with the generated UCVSs.

5. The method of claim 1, wherein the UCVSs are ordered from smallest to largest.

6. The method of claim 1, wherein the hierarchical, associative memory structure includes a ternary content addressable memory (TCAM).

7. The method of claim 6, wherein the TCAM includes one or more rows, and the method further comprises the step of:
indicating whether the UCVS associated with one of the one or more rows is a source or a destination address.

8. The method of claim 1, wherein the step of loading further comprises the step of:
loading a first random access memory (RAM) with the generated UCVSs.

9. The method of claim 1, wherein the addresses include Internet Protocol (IP) addresses.

10. The apparatus of claim 3, wherein the addresses are from access control entries (ACEs) of at least one access control list (ACL).

11. The apparatus of claim 10, further comprising:
means for ordering the UCVSs from smallest to largest.

12. The apparatus of claim 3, wherein the hierarchical, associative memory structure includes a top-level ternary content addressable memory (TCAM).

13. The apparatus of claim 12, wherein the TCAM includes one or more rows, and the apparatus further comprises:
means for indicating whether the UCVS associated with one of the one or more rows is a source or a destination address.

14. The apparatus of claim 3, wherein the means for loading comprises:
means for loading a first random access memory (RAM) with a generated UCVS.

15. A system comprising:
an associative memory structure;
an active control list (ACL) translation engine configured to identify a coordinate sub-field of addresses of network devices, the identified coordinate sub-field to have bit positions within the addresses that hold either a distinct value for an entire range of bit positions that constitute the coordinate sub-field or a don't care s value for the entire range of positions that constitute the coordinate sub-field, wherein the addresses include Internet Protocol (IP) addresses in hexadecimal format;
the ACL translation engine further configured to compute a minimum number of bits needed to represent the distinct values and a don't care value, if present, and to assign a unique coordinate value (UCV), that falls within the minimum number of bits, for each distinct value and the don't care value, if present, with each UCV being shorter than the corresponding value that the UCV replaces; and
the associative memory structure configured to store the distinct values and the don't care value, if present, and a random access memory (RAM) configured to cooperate with the associative memory structure and to store the UCVs in unique coordinate value sequences (UCVSs).

16. The system of claim 15, wherein the addresses are from access control entries (ACEs) of at least one ACL.

17. The system of claim 16, wherein the ACL is configured to order the UCVSs from smallest to largest.

18. The system of claim 15, wherein the coordinate sub-field corresponds to at least a portion of IP addresses-field.

19. The system of claim 15, wherein the associative memory structure includes a top-level ternary content addressable memory (TCAM).

20. The system of claim 19, wherein a first random access memory (RAM) is configured to load with a generated UCVS.

21. The system of claim 19, wherein the TCAM includes one or more rows, and the system further comprising:
an additional bit to indicate whether the UCVS associated with one of the one or more rows is a source or a destination address.

22. A method comprising:
identifying a coordinate sub-field of a plurality of addresses of network devices, each identified coordinate sub-field to have bit positions within the addresses that hold either a distinct value for an entire range of bit positions that constitute the coordinate sub-field or a don't care value for the entire range of positions that constitute the coordinate sub-field, wherein the addresses include Internet Protocol (IP) addresses in hexadecimal format;
computing, by an intermediate network device, a minimum number of bits needed to individually represent the distinct values and the don't care value, if present;
assigning, by the intermediate network device, a unique coordinate value (UCV), that falls within the previously computed minimum number of bits, for each distinct value and the don't care value, if present, with each UCV being shorter than the corresponding value that the UCV replaces;
storing the distinct values and the don't care value, if present, in an associative memory structure of the intermediate network device; and storing each of the UCVs in a memory of the intermediate network device configured to cooperate with the associative memory structure.

23. The method of claim 1 wherein the distinct value is a zero or a one.

\* \* \* \* \*